United States Patent

Allison

[15] 3,636,774
[45] Jan. 25, 1972

[54] DUAL MASS ACCELEROMETER WITH SEMICONDUCTIVE TRANSDUCER

[72] Inventor: James H. Allison, Arcadia, Calif.
[73] Assignee: Conrac Corporation, New York, N.Y.
[22] Filed: Aug. 25, 1969
[21] Appl. No.: 852,633

[52] U.S. Cl. .................................................73/496, 73/517
[51] Int. Cl. .......................................................G01p 15/08
[58] Field of Search ..........................73/71.2, 516, 517, 496

[56] References Cited

UNITED STATES PATENTS

| | | | |
|---|---|---|---|
| 2,302,670 | 11/1942 | Buchanan | 73/496 |
| 2,682,003 | 6/1954 | Stubner | 73/517 X |
| 2,822,161 | 2/1958 | Tikanen | 73/497 |
| 3,170,320 | 2/1965 | Talmo | 73/517 |
| 3,440,888 | 4/1969 | Southworth, Jr. et al. | 73/517 |

Primary Examiner—Richard C. Queisser
Assistant Examiner—Herbert Goldstein
Attorney—Charlton M. Lewis

[57] ABSTRACT

The inertial bodies are mounted for limited swinging movement about respective parallel, mutually spaced axes, with the centers of mass offset equally in a common direction from the axes. Acceleration parallel to the plane of the axes is sensed by flexure of beam structure interconnecting the bodies and carrying one or more semiconductive strain gage elements. The suspension and beam structure are protected against shock damage by positive stop means, and by selective damping produced by powdered metal in a closed chamber within one or both of the bodies. The powder gives little damping in the frequency range of interest, but is highly effective at higher frequencies including the natural frequency of vibration of the suspended system. A low-pass filter disables the output signal in the range of variable damping.

9 Claims, 7 Drawing Figures

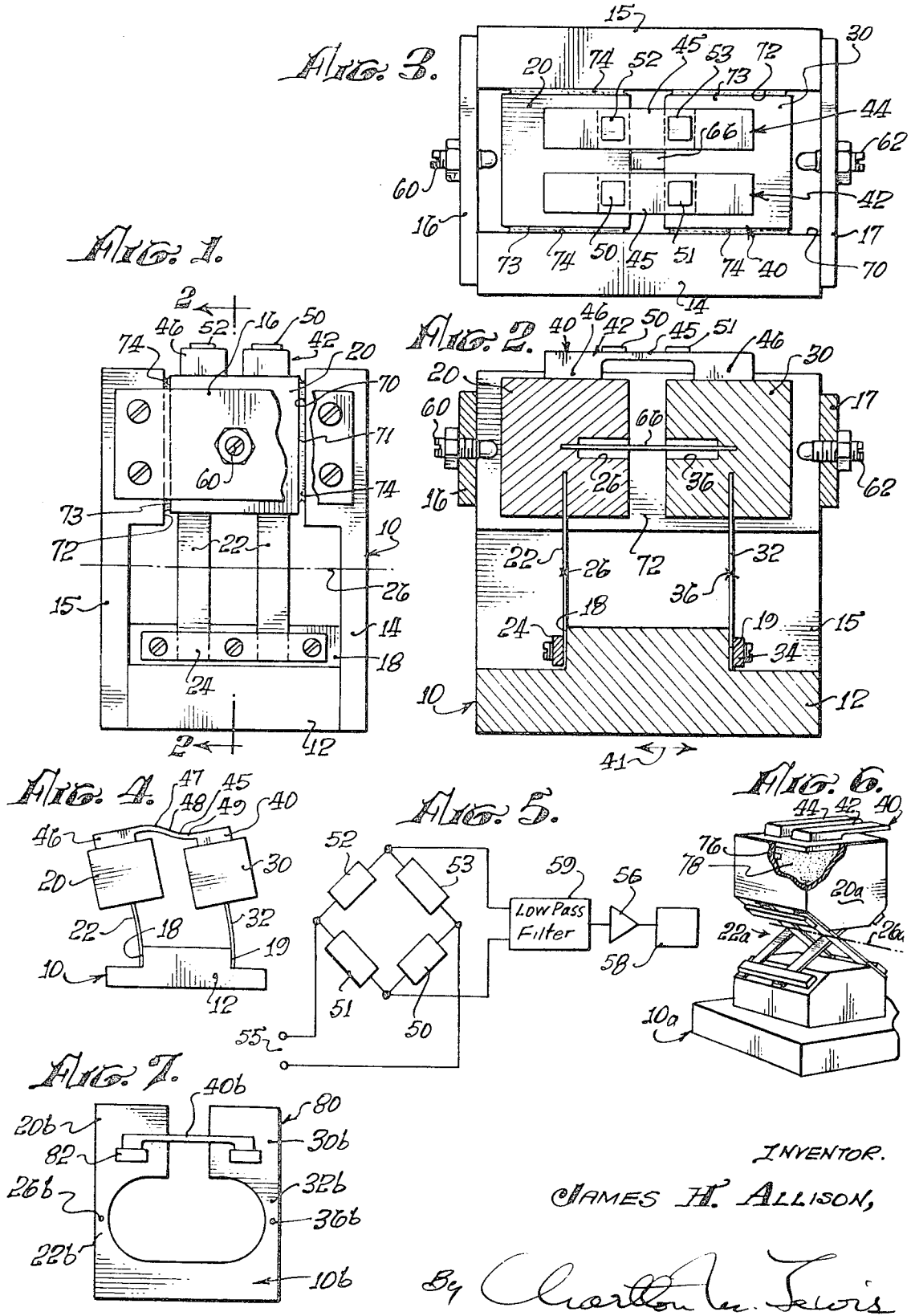

DUAL MASS ACCELEROMETER WITH SEMICONDUCTIVE TRANSDUCER

This invention has to do with accelerometers in which an inertial mass is suspended for movement relative to a support base, and the movement is sensed by a transducer.

Many different suspension structures have been proposed in which one or more link members are subject to stress when the support is accelerated. The stress of that link member can then be sensed by a suitable transducer, typically of the piezoresistive type, to indicate the magnitude of the acceleration.

An important object of the present invention is to provide a suspension system of the described general type in which the output signal is responsive to acceleration parallel to a selected direction and is essentially insensitive to accelerations perpendicular to that sensitive direction. Previous systems were unduly sensitive to such "crosstalk."

A further object of the invention is to provide a suspension in which the stress sensing link is protected from breakage under accidentally imposed accelerations or shocks perpendicular to the sensitive direction.

Those and other objects of the invention are accomplished by mounting two inertial bodies for limited swinging movement with respect to a support about respective parallel suspension axes, the centers of mass of the bodies being offset in the same direction from the plane of the axes. Acceleration of the support in a direction perpendicular to the suspension axes and parallel to their plane then tends to produce rotation of both bodies in the same direction about their respective axes. One or more links or beams are connected between the inertial bodies in a manner to receive flexure stress in response to such relative movement of the bodies. That flexure stress is sensed to provide a measure of the acceleration.

The stress sensing links typically comprise beams extending generally parallel to the plane of the suspension axes with their ends rigidly mounted on the respective bodies. Acceleration then tends to deflect the beams into an S-form. Two semiconductive strain gage elements may be carried on each beam at the points of maximum stress in opposite directions.

A further aspect of the invention provides improved damping means for instruments such as accelerometers in which a movable body is suspended for vibratory movement having a well-defined natural frequency of vibration that is higher than the frequency range to be sensed. It is well known that resonant vibration of an undamped vibratory system can produce large deflection amplitudes which may even injure or destroy a sensitive suspension system. On the other hand, within a frequency range spaced from the resonant frequency only very light damping may be required, such as can be provided conveniently by conventional means. The present aspect of the invention typically provides relatively light conventional damping throughout the frequency range of interest, thus insuring accurately linear response in that range; but applies relatively heavy damping at higher frequencies, which include the resonant frequency of the suspension, thus preventing the development of destructive resonance.

That is accomplished by providing in a movable element of the system a closed chamber nearly filled with a finely divided metal of high density, such as tungsten, for example. At low frequencies the powder tends to move as a unit, merely contributing to the effective mass of the moving element. Above a critical frequency the powder granules tend to act independently of each other, as has been described in U.S. Pat. No. 2,302,670 to James A. Buchanan, and their relative movement powerfully damps any high-frequency movement of the container. In accordance with the present invention, the instrument is so designed that its natural frequency falls above that critical frequency and within the frequency range in which the powder particles act independently to produce damping action. The invention further provides low-pass electronic filtering of the output signal, with cutoff below the region of variable damping. Such filtering effectively prevents spurious output signals within the frequency range of strong damping action, which has been found to be rather erratic, so that the strong selective damping is utilized only for protecting the suspension from excessive deflections.

A full understanding of the invention, and of its further object and advantages, will be had from the following description of certain illustrative manners of carrying it out, which description is to be read in conjunction with the appended drawings, in which FIG. 1 is an end elevation of an illustrative embodiment of the invention;

FIG. 2 is a section on line 2—2 of FIG. 1;

FIG. 3 is a plan, corresponding to FIGS. 1 and 2;

FIG. 4 is a schematic drawing illustrating a principle of operation of the embodiment of FIGS. 1 to 3;

FIG. 5 is a schematic diagram representing illustrative electrical circuitry;

FIG. 6 is a fragmentary perspective representing a modification; and

FIG. 7 is an elevation representing a further modification.

The illustrative accelerometer of FIGS. 1 to 3 comprises the rigid support frame 10 and the two inertial bodies 20 and 30. Frame 10 includes the support base 12, which is shown horizontal and will be so considered for purposes of description, but without implying any limitation as to the orientation in which the device might be used. Base 12 carries the vertically extending sidewalls 14 and 15 which are rigidly joined by the end brackets 16 and 17, forming a protective frame structure spacedly surrounding bodies 20 and 30.

The bodies 20 and 30 are mounted on base 12 by means of the respective flexure hinges 22 and 32, each of which typically comprises two parallel strips of resilient sheet material such as beryllium copper or a suitable type of stainless steel, for example. The hinge strips 22 and 32 are rigidly connected at their upper ends to the respective bodies in a plane passing through the center of mass of the body. A convenient method of mounting is to make a saw cut in the body just wide enough to receive the strip end, which is then retained with a suitable adhesive. The lower ends of hinge strips 22 and 32 are rigidly secured to base 12, as by being clamped against the respective vertical mounting ledges 18 and 19 by the clamping bars 24 and 34. The flexibility of hinge strips 22 and 32 then permits limited swinging movement of the bodies in the plane of FIG. 2 about respective axes indicated at 26 and 36. With flat strip hinges of the present type, those mounting axes are not positively defined, and tend to shift slightly in response to movement of the bodies. However, especially since that movement is in practice extremely slight, the axes can be considered fixed for purposes of description and analysis. Accordingly, acceleration of support frame 10 parallel to the sensitive direction indicted by the arrow 41 in FIG. 2 tends to cause each of the masses to swing in the same direction about its axis 26 or 36.

That swinging movement of inertial bodies 20 and 30 is restrained by resilience of the support and also by a beam structure 40, which interconnects the bodies in such a way as to be flexed in response to the body rotation. Beam structure 40 typically comprises the two parallel beams 42 and 44, which have their opposite ends rigidly mounted on the respective bodies, as by a suitable strong adhesive. Each beam typically comprises an elongated working section 45 of thin ribbonlike form and a relatively thick and effectively rigid mounting section 46 at each end. The twin beams 42 and 44 may be replaced, if preferred, by a single beam member, which may be of any desired width. The beams extend generally parallel to the plane of axes 26 and 36, and hence to the sensitive direction 41 of the accelerometer. They may be mounted at any convenient points of the inertial bodies, the present mounting on the upper surfaces of the bodies being only illustrative. In particular, it is generally advantageous to mount the beam ends in or close to the horizontal plane through the centers of mass of the two bodies.

A significant feature of the present structure is that in presence of acceleration the beam structure 40 tends to be deflected into an S-curve, with the two halves of the beams flexed in opposite directions. That is illustrated schematically and in greatly exaggerated form in FIG. 4. In that drawing the stressed working section of beam 40 is seen to comprise one end portion 47 that is convex upward, an opposite end portion 49 that is concave upward, and an intermediate portion 48 in which the curvature shifts from one direction to the other. The present invention takes advantage of that dual deflection of beam 40 by placing strain gage elements of any suitable type at both the convex and concave regions of deflection, preferably close to the points of maximum curvature in each instance, and connecting the elements in a bridge network in known manner so that opposite signals from the two elements are summed additively by the network. In practice, two distinct strain gage elements are preferably provided for each direction of beam deflection.

In the present embodiment, in which the beam structure comprises two beams, each of the beams typically carries two strain gage elements, one in each end portion. Such elements are indicated schematically at 50 and 51 on beam 42 and at 52 and 53 on beam 44. The four elements are typically connected in a Wheatstone bridge, as shown schematically in FIG. 5, with the elements that experience similar beam flexure in opposite arms of the bridge. Power is supplied to the bridge from a source indicated at 55. The bridge output is amplified at 56 and the resulting signal is then utilized in any desired manner, as indicted by the utilization device 58. The frequency spectrum of the output signal is limited to a predetermined range by a low-pass filter circuit, to be more fully described. Such a filter may be inserted on either side of amplifier 56, distributed on both sides, or incorporated within the amplifier, and is shown illustratively at 59 in FIG. 5. Additional filtering may be provided if desired, for example, to remove frequency components below the region of interest. The electrical connections to the four strain gage elements may be of conventional type, and are omitted from FIGS. 1 to 3 for clarity of illustration. Since all gage elements are positioned close together they can readily be maintained at essentially the same temperature. Hence, with suitable matching of the elements, the known compensating action of the bridge network produces substantial temperature independence over a wide range of temperature variation.

In preferred form of the invention, each of the beams 42 and 44 is a single crystal of silicon with the crystal axes suitably oriented, and the strain gage elements comprise piezoresistive strain gages formed in known manner integrally in the surface portions of the silicon beam. Such strain gage elements are typically essentially or wholly flush with the beam surface, the representation of the elements in FIGS. 1 and 2 being merely schematic.

An important advantage of the described suspension configuration results from its ability to combine high sensitivity to acceleration in the sensitive direction with relative immunity to damage from shocks or other excessive levels of acceleration, especially those acting perpendicularly to the sensitive direction. To further protect beam structure 40 from damage it is desirable to limit positively the maximum possible deflection of bodies 20 and 30 from their normal positions. For that purpose positive limit stops may be mounted in any suitable manner on support frame 10 for cooperating with suitable formations, or simply with surface points, on the inertial bodies. Such stops are shown somewhat schematically as the screws 60 and 62, which are adjustably threaded in the brackets 16 and 17 and are provided with locknuts. Those stop screws can be adjusted to normally have any desired spacing from the opposing surfaces of the bodies 20 and 30, and to engage those surfaces positively in response to deflection of the bodies exceeding the set clearance. Since the actual required movement of the inertial bodies is ordinarily extremely small, being typically of the order of 0.001 inch, suitable mechanism such as differential threads or the like is preferably provided to permit correspondingly precise adjustment of the stop formations.

The stopping action imposed by one stop upon its inertial body is preferably transmitted to the other inertial body independently of beam structure 40, as by interconnecting the bodies by a link member that maintains them at constant mutual spacing. Such a link member is shown as the flexible strip 66, which extends horizontally between the bodies with its opposite ends rigidly mounted essentially at their centers of gravity. The strip is laterally flexible, and the channels 26 and 36 provide it lateral clearance so that it does not significantly restrain the normallike swinging movement of the two bodies. However, strip 66 is essentially invariable in length, acting as a rigid link to maintain uniform separation of the two bodies. Hence the stop action of each of the screws 60 and 62 acts directly on one of the bodies and indirectly through link 66 on the other. Although shown as a uniformly flexible ribbon, link 66 may comprise an effectively rigid central section with relatively short flexible sections adjacent its points of connection to the respective bodies.

The flexible hinge structures shown at 22, 32 and 66 are illustrative of a wide variety of known pivot and hinge devices that may be employed. In particular, the crossed flexure structure 22a shown in FIG. 6 has the advantage of defining positively the position of the effective mounting axis 26a. For clarity of illustration, only one inertial body 20a is shown explicitly in FIG. 6, and the support structure 10a is indicated only schematically. The beams 42 and 44 are to be understood to extend to a second, similarly suspended body, and to carry sensing transducers in the manner already described.

FIG. 7 further illustrates the wide variety of specific structures and configurations that may be employed in carrying out the invention. In FIG. 7 the two inertial bodies 20b and 30b, the base 12b, and the suspension hinge structures 22b and 32b are all formed integrally as the indicated portions of a suitably formed, relatively thick plate member 80. The material may be cut away to any desired extent at the flexure hinges to produce the desired stiffness. The effective mounting axes 26b and 36b in FIG. 7 are more widely spaced from each other than are the centers of mass of the two bodies 20b and 30b. That modified configuration is particularly suitable for an instrument intended for measuring large accelerations, for example up to 10,000 g. or more.

FIG. 7 also represents illustrative mounting of the sensing beam structure essentially at the centers of mass of the two inertial bodies. As shown, shelflike bracket formations 82 are rigidly formed on the side faces of those bodies, and the beam structure 40b, typically comprising two beam members as before, is mounted on those formations.

The described accelerometer mechanisms may be damped in conventional manner. For example, in FIGS. 1 to 3 the sidewalls 14 and 15 of the support frame typically carry flat surfaces 70 and 72 which are closely spaced from the opposing side faces 71 and 73 of the inertial bodies. A suitable damping liquid 74, such as silicone oil, for example, is applied between those opposing faces, where it is retained by surface tension. The degree of damping required for normal operation depends in known manner on many factors, including in particular the natural frequency of vibration of the two bodies 20 and 30 on their suspension 22, 32, taking account of the restraining action of beam structure 40 and of link 66 if used. In general, that natural frequency of vibration is considerably higher than the range of acceleration frequencies that is of interest, and moderate damping such as has been described is then sufficient during normal operation.

In accordance with a further aspect of the invention, it has been found highly desirable to provide relatively strong protective damping that will limit the maximum reaction forces that can be exerted on beam structure 40 by abrupt accelerations of abnormally high magnitude, such as may result from accidental shocks, for example. Moreover, if the normal damping is appreciably less than "critical damping," then externally imposed vibration of the apparatus at or near the natural frequency of the suspension system may produce excessive deflection amplitudes. Although the described stop mechanism can in theory protect beam structure 40 from damage from such vibration, it is preferred to prevent such motions by selective damping that acts especially strongly in the neighborhood of the natural frequency.

The invention obtains selective damping of that type by providing one or more fully enclosed chambers in one or both of the inertial bodies, as indicated schematically at 76 in FIG. 6. The chambers are nearly filled with finely divided particles 78 of a metal of high density, such as tungsten, for example, leaving only about 5 or 10 percent of the space unoccupied. Granular material having a grain size less than about 100 microns has been found best for this purpose. In presence of an imposed vibratory acceleration of low frequency, for example in the range up to about 100 cycles per second, such granular material acts as a unitary solid mass, evidently because all granules move together as a unit. At frequencies between about 100 and about 500 cycles per second the individual granules behave increasingly as independent masses, so that their relative movement absorbs energy and produces effective damping action. Above about 500 cycles per second that damping is highly effective. In accordance with the present invention the suspension system is so designed that its effective natural frequency of vibration, lies in the range of fully effective damping action, typically above about 500 cycles per second. Especially when the filling of loose powder constitutes a large fraction of the total inertial mass, the system typically has no well defined or readily measurable natural frequency. However, the term "effective natural frequency," as used above, refers to the value that would obtain in absence of any relative movement of the granules.

The invention further provides in the output circuitry from the flexure sensing transducer system a suitable electronic low-pass filter, as indicated at 59 in FIG. 5, with cutoff frequency below the range of effective damping of the granular mass 78. Filter 59 preferably is essentially ineffective throughout the frequency range of interest, which is typically the range below about one-fifth of the natural frequency, in which the accelerometer output tends to be inherently linear. The filter is designed to give a relatively sharp cutoff, the exact position of which will depend upon the particular design and requirements of the instrument. However, that cutoff frequency is typically between about 100 and about 500 cycles per second, and, in any case, is less than the above defined effective natural frequency of vibration of the suspension system. With that combination of selective damping structure and output filtering action the sensitive silicon beam structure 40 is protected by powerful damping against impulse loads of many types, while maintaining the full sensitivity and linearity of response of which the system is capable in the frequency region of direct interest. Additional filtering may be provided in special cases in which the region of response is to be further restricted for any reason, for example to exclude very low frequencies by insertion of a high-pass filter, or to limit the response to a particularly low range of frequencies.

I claim:

1. An accelerometer, comprising in combination
   a support,
   two inertial bodies,
   structure mounting the bodies for limited swinging movement with respect to the support about respective, parallel axes mutually spaced in a plane, the centers of mass of the bodies being offset on the same side of the plane,
   a beam extending generally parallel to the plane and having its ends rigidly mounted on the respective bodies,
   and transducer means responsive to flexure stress of the beam resulting from acceleration having a component parallel to the plane and perpendicular to the axes.

2. An accelerometer as defined in claim 1, and in which the centers of mass of the two bodies are equally offset from said plane.

3. An accelerometer as defined in claim 1, and in which the centers of mass of the two bodies are equally offset in a common direction from the respective axes.

4. An accelerometer as defined in claim 1, and in which said transducer means comprise two semiconductive strain gage elements carried by the beam in longitudinally spaced relation thereon, and circuit means interconnecting the strain gage elements in a bridge network that is cumulatively responsive to flexure stress of the beam in opposite directions at the respective elements.

5. An accelerometer as defined in claim 1, and including two beams extending generally parallel to said plane and to each other with their opposite ends rigidly mounted on the respective bodies,
   said transducer means comprising semiconductive strain gage elements carried by the respective beams and circuit means interconnecting the elements and cumulatively responsive to similar stresses of the respective beams.

6. An accelerometer as defined in claim 1, and in which said body mounting structure is substantially inflexible in the direction parallel to said axes.

7. An accelerometer as defined in claim 1, and including also
   interengageable stop formations on the support and on one of the bodies for limiting said swinging movement of that body in one direction,
   interengageable stop formations on the support and on the other body for limiting said swinging movement of the other body in the other direction,
   and laterally flexible structure interconnecting the bodies effectively at their centers of mass for maintaining essentially uniform mutual spacing thereof.

8. An accelerometer as defined in claim 1, and in which
   at least one of said bodies is formed with a fully enclosed internal chamber containing granular metal of a particle size to damp said body movement selectively in a frequency range that includes the effective natural frequency of vibration of the mounted bodies,
   and said accelerometer includes low-pass filter means for substantially eliminating from the transducer response the frequency components within said frequency range.

9. In a measuring instrument, the combination of
   a support,
   a body resiliently mounted on the support for oscillatory movement and having an effective natural frequency of vibration with respect to the support,
   a fully enclosed chamber in the body, containing granular metal of a particle size to damp body movement selectively in a frequency range that includes the effective natural frequency of vibration of the supported body and excludes all frequencies within a selected frequency range that is spaced below said natural frequency,
   transducer means for producing an electrical signal responsive to said body movement,
   low-pass filter means for transmitting frequencies in said selected frequency range and for substantially removing from said signal all of the frequency components within the frequency range that is effectively damped by the granular metal,
   and damping mechanism acting independently of the granular metal to damp the body movement substantially linearly throughout the range of frequencies transmitted by the low-pass filter means.

* * * * *